United States Patent [19]

Köhnert

[11] Patent Number: 4,633,764
[45] Date of Patent: Jan. 6, 1987

[54] ALUMINUM BASE ALLOY PISTON FOR INTERNAL COMBUSTION ENGINES WITH MECHANICALLY SURFACE-CONDENSED BOSS BORES

[75] Inventor: Hans-Jürgen Köhnert, Winnenden, Fed. Rep. of Germany

[73] Assignee: Mahle GmbH, Fed. Rep. of Germany

[21] Appl. No.: 699,100

[22] Filed: Feb. 7, 1985

[30] Foreign Application Priority Data

Feb. 11, 1984 [DE] Fed. Rep. of Germany ....... 3404903

[51] Int. Cl.$^4$ .............................................. F02F 3/00
[52] U.S. Cl. ................................ 92/208; 29/156.5 R; 92/222; 123/193 P
[58] Field of Search ...................... 29/156.5 R; 92/208, 92/222; 123/193 P

[56] References Cited

U.S. PATENT DOCUMENTS 3,324,772 6/1967 Wittstock .................. 29/156.5 R X
4,124,010 11/1978 Fiedler ............................ 123/193 P Primary Examiner—Gerald A. Michalsky
Attorney, Agent, or Firm—James C. Wray

[57] ABSTRACT

A cast aluminum piston for internal combustion engines having mechanically compacted inner boss bore faces, the structure of the aluminum material disposed below these inner faces having a grain pattern orientated in the circumferential direction of the boss bore over a radial depth of at least 0.1 mm and preferably 0.2 mm. This grain pattern is achieved by rolling at a temperature of at least 350 degrees C. up to 400 degrees C. with simultaneous expansion of the bore diameter by about 0.2 to 0.5 mm.

6 Claims, 4 Drawing Figures 4,633,764

ALUMINUM BASE ALLOY PISTON FOR INTERNAL COMBUSTION ENGINES WITH MECHANICALLY SURFACE-CONDENSED BOSS BORES

BACKGROUND TO THE INVENTION

This invention relates to a cast aluminum piston for internal combustion engines.

STATEMENT OF PRIOR ART

From U.S. Pat. No. 4,124,010 it is known mechanically to condense the surface of the cast aluminum material in the boss bores along the peripheral surface thereof. This condensing process occurs by an expanding rolling of the piston at room temperature. Such condensing increases the strength of the aluminum material in the region of the boss bore surface, i.e., the boss bores can thus be increased in terms of safety from boss cracks starting from the boss bore. At relatively high piston loadings, measures hitherto adopted to increase the resistance to boss cracks have not however proved to be adequate.

OBJECT OF THE INVENTION

An object of the invention is to provide a piston in which the boss bores are so treated that they are more resistant to cracking.

SUMMARY OF THE INVENTION

According to the invention there is provided an aluminum silicon alloy piston for internal combustion engines having a piston head, a cylindrical skirt connected at one end to said head, and two gudgeon pin bosses having bores located on a common axis and extending radially inwards from said skirt, the improvement being that the body of aluminum material defining the boss bores is mechanically compacted by surface treatment whereby the grain structure in the region of said bore surfaces is orientated with the silicon grain lengths extending in the circumferential direction of the boss bores over a radial depth of at least 0.1 mm and is free of residual pressure stresses by having roll-burnished the bore surfaces with the piston heated to a temperature of at least 350 degrees C.

Further according to the invention there is provided a method of treating an aluminum silicon alloy piston for internal combustion engines, said piston having a piston head, a cylindrical skirt connected to one end to said head, and two gudgeon pin bosses having bores located on a common axis and extending radially inwards from said skirt, comprising heating said piston to a temperature of at least 350 degrees C., and simultaneously working the surfaces of the boss bores by the application of pressure along a substantially circumferential direction so that each bore expands by an amount of from 0.2 to 0.5 mm and the grain structure is orientated in the region of the boss bore surfaces with the grain lengths extending in the circumferential direction of the boss bores over a radial depth of at least 0.1 mm.

It has been found that the best results are achieved by effecting working of the structure by rolling on the already preturned boss bore which still requires further machining, the radial measure of the additional machining required being so predetermined that after rolling, removal of material into the formed zone of the aluminum material can still take places over the total length and the total circumference of the boss bore.

BRIEF DESCRIPTION OF DRAWINGS

The invention will now be described by way of example with reference to the accompanying drawings in which.

DESCRIPTION OF PREFERRED EMBODIMENTS

Figure 1:
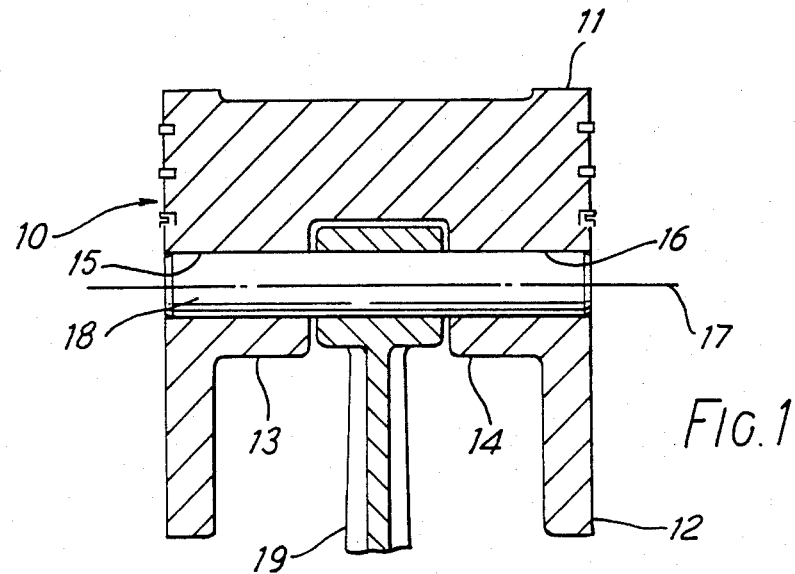
FIG. 1 is a cross sectional view of a piston of the present invention fitted with a gudgeon pin and the little end of a connecting rod.
Figure 2:
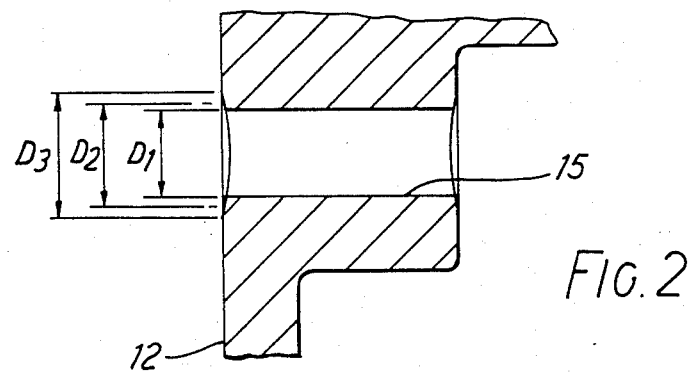
FIG. 2 is an enlarged cross sectional view of one of the piston pin bores prior to pressure treatment.

As shown in FIG. 1 a cast aluminum silicon alloy piston 10 is formed with a head 11 and a skirt 12. Extending radially inwardly from the skirt are two gudgeon pin bosses 13, 14 having bores 15, 16 disposed on a common axis 17. A gudgeon pin 18 connects the piston 10 with the little end of a connecting rod 19.

The boss bores 15, 16 are first preturned to a diameter D1 which is approximately 0.4 mm smaller than the diameter D3 of the completely machined boss bore. The preturned boss bore is then expanded in diameter by an amount of 0.2 to 0.5 mm (preferably 0.22 mm), diameter D2 by rolling in substantially circumferential direction at a temperature of at least 350 degrees C. (e.g. 400 or 450 degrees C.). The forming zone within which the structure of the aluminum alloy is orientated in the peripheral direction of the boss bore, i.e., in which a grain pattern is created which is orientated in the circumferential direction of the boss bore, measures in radial depth about 0.35 mm. Subsequently, the boss bore is turned to the finished dimension, diameter D3.

Figure 3:
FIGS. 3 and 4 show respectively the grain structure, about 100 times magnification, prior to pressure treatment and after, the bore surfaces being at the top of the figures; the polished sections having been taken at right angles to the axis of the boss bore.
Figure 4:
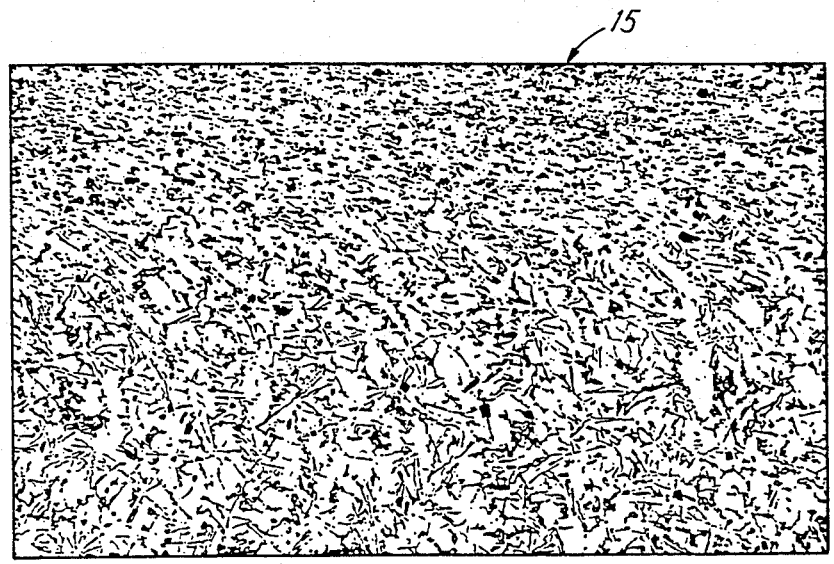

The orientation of the grains is clearly seen by comparison of FIG. 4 with FIG. 3. The grains are randomly arranged in FIG. 3 where the material was neither roll burnished nor hot rolled whereas from FIG. 4 the majority of the grains are seen at the surface region orientated with their lengths in the direction of the circumference of the bore.

The secondary machining of the boss bore after rolling is necessary since expansion varies over the length of the boss bore, i.e., the boss bore widens out more intensely at the ends than in the centre.

Pressure rolling may be carried out by using a machine of the kind described in U.S. Pat. No. 4,124,010.

The explanation of the success in terms of reduction in the likelihood of cracking attainable according to the invention can be ascertained from the ensuing explanation.

Cold compressing of the surface of the boss bores by rolling, indicated at the outset as being the state of the art, produces residual pressure stresses in an extremely small surface steps. If these residual pressure stresses are not excessively high, they can have a thoroughly positive effect on the boss strength. Therefore, this method is very frequently used in practice. Under extremely high loadings, however, it has been found that the desired and hoped-for increase in strength does not occur. In the past, though, there has been no explanation of this. Therefore, in practice, what is known as the cold-rolling method of compaction is still regarded as one of the normal methods of increasing boss strength.

With the knowledge according to the present invention, the loss of effect of previous methods under extremely high loading is based on the following circumstance. If the material in the bosses of the piston attains temperatures of between 200 and 150 degrees C., then the cold-formed structure starts to grow quite considerably due to recrystallisation or recovery processes. What is involved is a change of structure. Thus the volume of the compacted area increases. In consequence, in addition to the residual pressure stresses introduced, additional pressure stresses come into play due to the growth process. These can achieve very high levels. In the end, this means that the residual pressure stresses occurring in toto in the compacted zone become so highly cumulative that shear stress cracks are created.

This effect is especially marked particularly in aluminum/silicon alloys. If, by reason of excessively high residual pressure stresses, such as occur if engines are run at high temperatures, the material is already slightly damaged, then the bore cracks which it is intended actually to avoid by cold compaction do in principle occur rather sooner than in non-compacted material.

Where the solution according to the invention is concerned, therefore, compression of the surface zone is not carried out in the boss bores in a cold state. Instead, the surface is rolled at an elevated temperature at which the structure can be altered without introducing residual stresses. In this way, it is possible to orientate the grain pattern with their lengths extending in a circumferential direction and to an adequate depth of the material, i.e., in each case tangentially to the circumferential direction; this being for practical purposes an elastic deformation in a circumferential direction. This circumferentially orientated grain pattern according to the invention produces the desired increase in strength which does not lose its effect even at working temperatures of between 200 and 250 degrees C. This is based essentially upon the fact that with the compression that has taken place under heat, with simultaneous grain orientation, no residual pressure stresses are introduced into the material.

I claim:

1. An aluminum silicon alloy piston for internal combustion engines having
   (a) a piston head;
   (b) a cylindrical skirt connected at one end to said head; and
   (c) two gudgeon pin bosses having bores located on a common axis and extending radially inwards from said skirt;
   (d) the improvement being that the grain structure of the aluminum material defining the boss bores is orientated with the silicon grain lengths extending in the circumferential direction of the boss bores over a radial depth of at least 0.1 mm and is free of residual pressure stresses by having roll-burnished the bore surfaces with the piston heated to a temperature of at least 350 degrees C.

2. A aluminum silicon alloy piston according to claim 1, wherein the grain orientation extends to a depth of 0.2 mm.

3. A method of treating an aluminum silicon alloy piston for internal combustion engines, said piston having a piston head, a cylindrical skirt connected to one end to said head, and two gudgeon pin bosses having bores located on a common axis and extending radially inwards from said skirt, comprising
   (a) heating said piston to a temperature of at least 350 degrees C.; and
   (b) simultaneously roll-burnishing the surfaces of the boss bores by the application of pressure along a substantially circumferential direction so that each bore expands by an amount of from 0.2 to 0.5 mm and the grain structure is orientated in the region of the boss bore surfaces with the grain lengths extending in the circumferential direction of the boss bores over a radial depth of at least 0.2 mm.

4. A method according to claim 3, wherein the working of the boss bore surfaces is carried out until the grain structure is orientated with the grain lengths extending in the circumferential direction over a radial depth of 0.2 to 0.5 mm.

5. A method according to claim 3 or 4, wherein the piston is first heated to a temperature of at least 400 degrees C.

6. A method according to claim 3, wherein prior to the heating and rollburnishing steps the bores are machined to a predetermined dimension and after working the surfaces of the boss bores to effect expansion and grain orientation the bores are further machined to the desired tolerance, said further machining taking place over the total length and the total circumference of each boss bore.

* * * * *